(12) United States Patent
Mihalache (10) Patent No.: US 10,355,617 B2
(45) Date of Patent: Jul. 16, 2019

(54) MEDIUM VOLTAGE TRANSFORMERLESS MULTILEVEL CONVERTER AND METHOD FOR CONTROLLING A MEDIUM VOLTAGE TRANSFORMERLESS MULTILEVEL CONVERTER

(71) Applicant: Siemens Aktiengesellschaft, München (DE)

(72) Inventor: Liviu Mihalache, Valencia, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/758,495

(22) PCT Filed: Nov. 13, 2015

(86) PCT No.: PCT/US2015/060611
§ 371 (c)(1),
(2) Date: Mar. 8, 2018

(87) PCT Pub. No.: WO2017/082922
PCT Pub. Date: May 18, 2017

(65) Prior Publication Data
US 2018/0248493 A1     Aug. 30, 2018

(51) Int. Cl.
*H02M 1/00* (2006.01)
*H02M 1/08* (2006.01)
(Continued)

(52) U.S. Cl.
CPC ............. *H02M 7/487* (2013.01); *H02M 1/08* (2013.01); *H02M 7/483* (2013.01);
(Continued)

(58) Field of Classification Search
CPC ...... H02P 1/00; H02P 1/04; H02P 1/12; H02P 1/24; H02P 6/12; H02P 7/0044;
(Continued)

(56) References Cited

U.S. PATENT DOCUMENTS 6,058,031 A * 5/2000 Lyons ................... H02M 7/487
363/132
9,083,230 B2 * 7/2015 Narimani ................ H02M 3/07
(Continued)

FOREIGN PATENT DOCUMENTS

CN      103401268 A     11/2013
CN      104883072 A      9/2015
(Continued)

OTHER PUBLICATIONS

PCT International Search Report and Written Opinion of International Searching Authority dated Aug. 2, 2016 corresponding to PCT International Application No. PCT/US2015/060611 filed Nov. 13, 2015.

*Primary Examiner* — Antony M Paul (57) ABSTRACT

A multilevel converter includes single phase configurations. A single phase configuration has a first half-bridge (HB) module, a second HB module separated by a first capacitor coupled to a DC link, and a neutral point clamped (NPC) module clamped to the first HB module and the second HB module. Further, the single phase configuration has a first individual switching device and a second individual switching device, the first individual switching device operably connected to the first HB module and the NPC module, and the second individual switching device operably connected to the second HB module and the NPC module. The converter further includes a power output assembly comprising multiple phases and providing multiple-phase alternating (AC) power, wherein the single phase configuration supplies (Continued)

power to one of the multiple phases of the power output assembly.

18 Claims, 8 Drawing Sheets

(51) Int. Cl.
*H02M 7/483* (2007.01)
*H02M 7/487* (2007.01)
*H02P 27/08* (2006.01)
*H02M 7/5395* (2006.01)

(52) U.S. Cl.
CPC .......... *H02M 7/5395* (2013.01); *H02P 27/08* (2013.01); *H02M 2001/007* (2013.01); *H02M 2007/4835* (2013.01)

(58) Field of Classification Search
CPC .......... H02P 7/0066; H02P 7/29; H02P 11/00; H02P 21/00; H02P 23/00; H02P 25/00; H02P 27/00; H02P 27/04; H02P 27/06; H02P 27/08; G05B 11/28; H02M 3/07; H02M 7/483; H02M 7/5395; H02M 2007/4835; H02M 1/08
USPC ......... 318/400.01, 400.02, 400.14, 599, 700, 318/701, 727, 779, 799, 800, 801, 400.26, 318/400.27; 363/21.1, 40, 44, 95, 120, 363/175
See application file for complete search history.

(56) References Cited

U.S. PATENT DOCUMENTS

| | | | |
|---|---|---|---|
| 9,325,252 B2 * | 4/2016 | Narimani | H02M 5/4585 |
| 9,571,004 B2 * | 2/2017 | Lavieville | H02M 7/537 |
| 2005/0139259 A1 | 6/2005 | Steigerwald et al. | |
| 2011/0260701 A1 | 10/2011 | Hoerger et al. | |
| 2013/0207623 A1 | 8/2013 | Wong | |
| 2013/0249322 A1 * | 9/2013 | Zhang | H02M 7/483 307/151 |
| 2014/0003095 A1 | 1/2014 | Thomas et al. | |
| 2015/0263645 A1 | 9/2015 | Mihalache | |

FOREIGN PATENT DOCUMENTS

| | | |
|---|---|---|
| EP | 1742342 A1 | 1/2007 |
| EP | 2662969 A1 | 11/2013 |
| EP | 2724456 A1 | 4/2014 |
| EP | 2945272 A1 | 11/2015 |
| ES | 2319251 A1 | 5/2009 |
| ES | 2327371 B1 | 8/2010 |
| JP | 2011142783 A | 7/2011 |
| RU | 2529017 C2 | 9/2014 |
| RU | 2014108141 A | 9/2015 |
| WO | 2012024984 A1 | 3/2012 |
| WO | 2012176006 A1 | 12/2012 |
| WO | 2013017353 A1 | 2/2013 |
| WO | 2015 003734 A1 | 1/2015 |
| WO | 2015007186 A1 | 1/2015 |

* cited by examiner

MEDIUM VOLTAGE TRANSFORMERLESS MULTILEVEL CONVERTER AND METHOD FOR CONTROLLING A MEDIUM VOLTAGE TRANSFORMERLESS MULTILEVEL CONVERTER

CROSS REFERENCE TO RELATED APPLICATIONS

This application is the U.S. National Stage of International Application No. PCT/US2015/060611 filed 13 Nov. 2015 and claims benefit thereof, the entire content of which is hereby incorporated herein by reference.

BACKGROUND

1. Field

Aspects of the present invention generally relate to a medium voltage transformerless multilevel converter and a method for controlling a medium voltage transformerless multilevel converter.

2. Description of the Related Art

Traditionally, multilevel power converters are used in the applications of medium voltage AC drives, flexible AC transmission systems (FACTS), and High Voltage DC (HVDC) transmission systems, because single power semiconductor devices cannot handle high voltage.

Multilevel power converters comprise multilevel topologies which provide a clever way of connecting switches in series, thus enabling the processing of voltages that are higher than the device rating. The industry need for medium voltage drives has triggered considerable research in this field, in which most applications include drives for pumps, blowers, compressors, conveyors, and the like. There are a limited number of topologies that provide multilevel voltages and are suitable for medium voltage applications. The most known topologies are the neutral-point-clamped (NPC) topology, the flying capacitor (FC) topology, and the cascaded H-bridge multilevel topology.

A cascaded multilevel converter is a preferred topology in many medium and high voltage applications. The topology is well established in the industry for over two decades but it also has certain drawbacks, mainly the costs associated with a special transformer required to provide isolated power to each power cell. In addition, cascaded multilevel topology has been traditionally implemented only in unidirectional power flow applications, thus it cannot provide regenerative braking in motor application. For example, a four quadrant operation is possible but such an operation would significantly increase the power cell cost and still require a transformer. A modular multilevel converter is another topology which is still under development. This topology may work with or without a transformer, therefore it may be beneficial in applications were regenerative braking is required; however, the topology requires an increased number of semiconductors and its operation at low speed/ high torque is very challenging. At a lower end of the medium voltage power level, both the cascaded and the modular multilevel topologies tend to be very expensive.

SUMMARY

Briefly described, aspects of the present invention relate to a transformerless multilevel converter, an electric drive system comprising a transformerless multilevel converter, and a method for controlling a transformerless multilevel converter.

A first aspect of the present invention provides a multilevel converter comprising a plurality of single phase configurations, a single phase configuration comprising a first half-bridge (HB) module and a second HB module separated by a first capacitor coupled to a DC-link providing voltage to the single phase configuration, a neutral point clamped (NPC) module, the NPC module being clamped to the first HB module and the second HB module, a first individual switch and a second individual switch, the first individual switch operably connected to the first HB module and the NPC module, and the second individual switch operably connected to the second HB module and the NPC module; and a power output assembly comprising three phases and providing three-phase alternating (AC) power, wherein the single phase configuration supplies power to one of the three phases of the power output assembly.

A second aspect of the present invention provides a method for controlling a multilevel converter comprising providing single phase configurations including a plurality of switching devices; and switching the plurality of switching devices using pulse width modulation (PWM), wherein the plurality of switching devices are switched at a same switching frequency, and wherein a plurality of complementary pairs of PWM control signals are used to switch the plurality of switching devices.

A third aspect of the present invention provides an electric drive system comprising a power source assembly comprising a direct current (DC) link; a multilevel converter coupled to the DC link for producing a multi-phase power, the converter comprising single phase configurations, wherein the DC link provides voltage to the single phase configurations, a single phase configuration comprising a first half-bridge (HB) module and a second HB module separated by a first capacitor coupled to the DC-link, a neutral point clamped (NPC) module, the NPC module being clamped to the first HB module and the second HB module, a first individual switch and a second individual switch, the first individual switch operably connected to the first HB module and the NPC module, and the second individual switch operably connected to the second HB module and the NPC module; and a power output assembly comprising three phases and providing three-phase alternating power, wherein the single phase configuration supplies power to one of the three phases of the power output assembly.

DETAILED DESCRIPTION

To facilitate an understanding of embodiments, principles, and features of the present invention, they are explained hereinafter with reference to implementation in illustrative embodiments. In particular, they are described in the context of being a transformerless multilevel converter, an electric drive system comprising such a transformerless multilevel converter, and a method for controlling such a transformerless multilevel converter. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

The described transformerless multilevel converter comprises a five-level medium voltage topology which may be used for medium voltage motor drive applications. Medium voltage applications are applications, for example medium-voltage alternating current (AC) motors, such as those used in industrial process control, operating in a range above 1 kV and/or below 50 kV, in particular between 4.16 kV and 13.8 kV.

Figure 1:
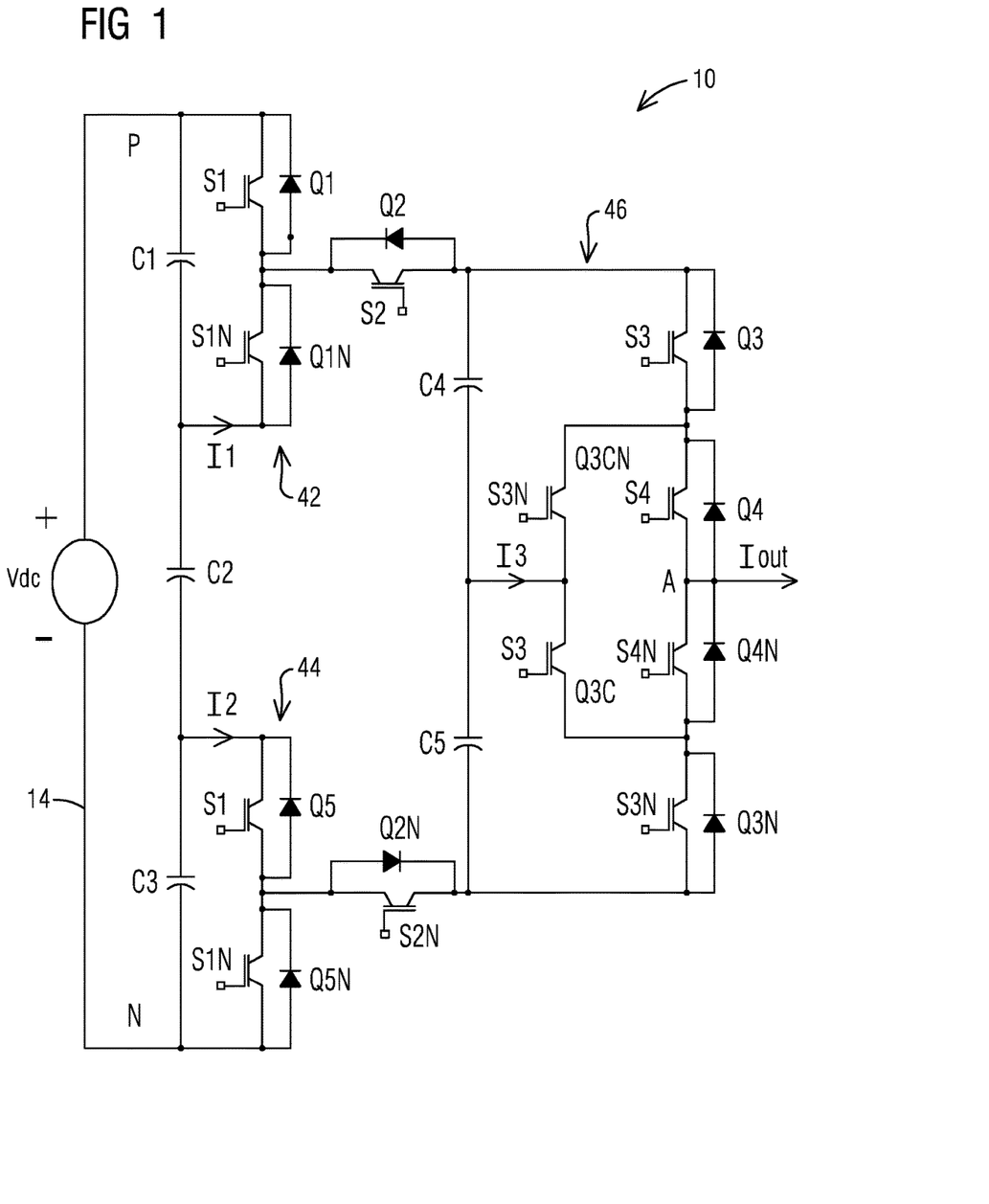
FIG. 1 illustrates a schematic of an embodiment of a proposed topology for one phase of a transformerless multilevel converter in accordance with an exemplary embodiment of the present invention.

FIG. 1 illustrates a schematic of an embodiment of a proposed topology for one phase of a transformerless multilevel converter in accordance with an exemplary embodiment of the present invention.

FIG. 1 illustrates a single phase configuration 10, herein also referred to as single phase module 10, with a proposed topology for one phase A of a three-phase motor drive voltage inverter. For each phase of the exemplary inverter, the proposed topology comprises two half-bridge (HB) modules 42, 44 separated by a DC link capacitor C2, a neutral point clamped (NPC) module 46 and two individual switching devices Q2, Q2N.

The circuitry for a first HB module 42 comprises power semiconductor switching devices Q1 and Q1N, and capacitor C1 rated for one fourth of a provided direct current (DC) link voltage Vdc of DC link 14. The circuitry for a second HB module 44 comprises power semiconductor switching devices Q5 and Q5N, and capacitor C3 rated for one fourth of the provided DC-link voltage Vdc of DC link 14.

A configuration of a neutral point clamped (NPC) module 46 comprises power semiconductor switching devices Q3, Q3N, Q3C, Q3CN, Q4, Q4N and capacitors C4, C5. Both capacitors C4, C5 are rated for one fourth of the provided DC-link voltage Vdc. A further capacitor C2 separates the two HB modules 42, 44, wherein capacitor C2 is rated for half the DC-link bus voltage Vdc. Furthermore, the proposed topology of module 10 comprises two individual switching devices Q2 and Q2N, each arranged between one of the HB configurations 42, 44 and the NPC configuration 46.

The switching devices Q1, Q1N, Q2, Q2N, Q3, Q3N, Q3C, Q3CN, Q4, Q4N, Q5, Q5N may include, for example and without limitation, power transistors such as insulated-gate bipolar transistors (IGBT). As FIG. 1 shows, there are no switching devices connected in series. According to the described embodiment, the proposed topology comprises a total of 12 switching devices Q1, Q1N, Q2, Q2N, Q3, Q3N, Q3C, Q3CN, Q4, Q4N, Q5, Q5N per phase.

DC link 14 comprises positive input terminal P and negative input terminal N. Input voltage of the DC link 14 can be provided for example by a standard transformer/diode rectifier. Alternatively, a back-to-back inverter arrangement can be used, as illustrated for example in FIG. 5, for a typical transformerless motor drive topology. The described topology of FIG. 1 produces an output as phase voltage potential of phase A and phase output current $I_{OUT}$.

Figure 2:
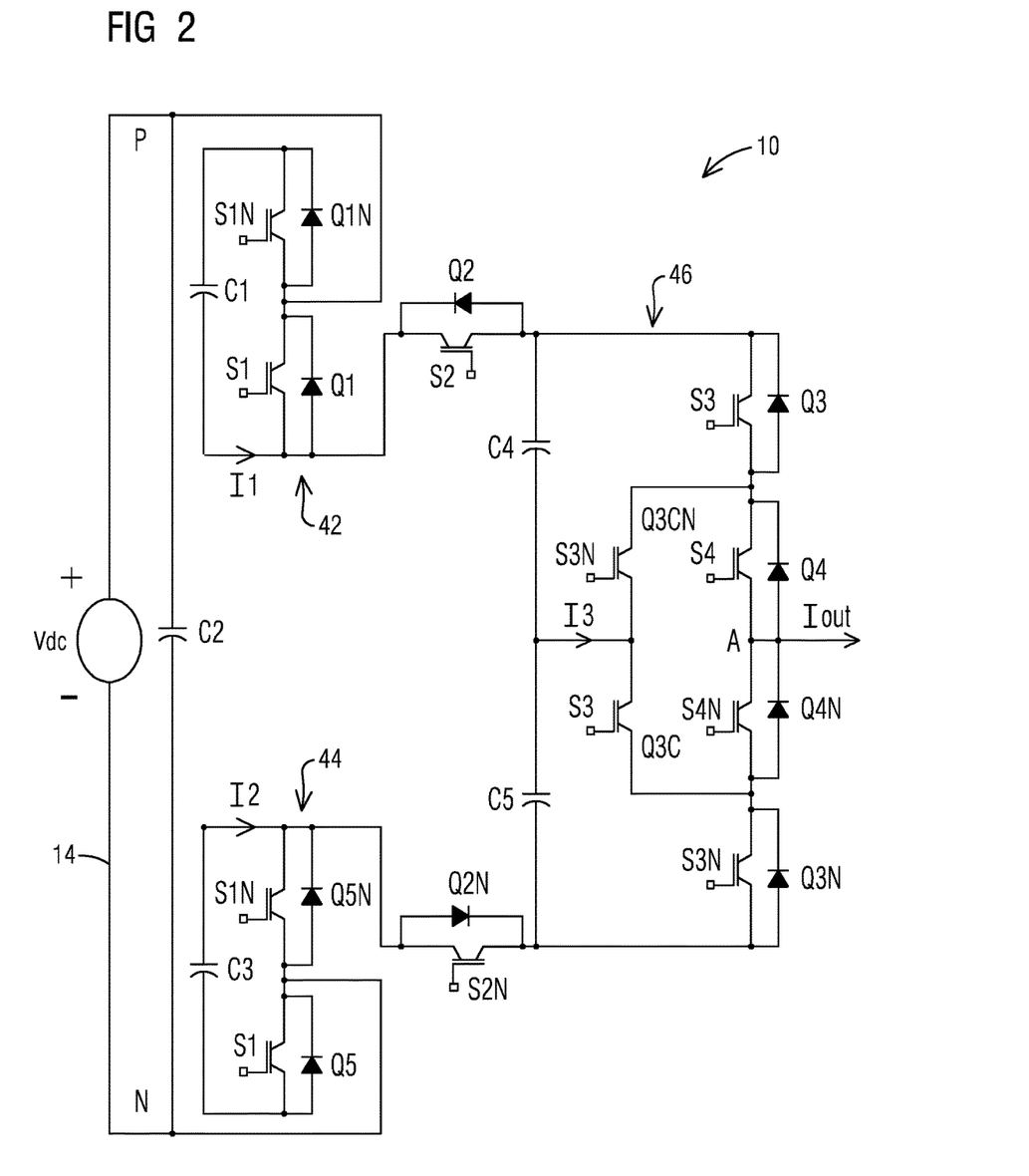
FIG. 2 illustrates a schematic of a further embodiment of a proposed topology for one phase of a transformerless multilevel converter in accordance with an exemplary embodiment of the present invention.

FIG. 2 illustrates a schematic of a further embodiment of a proposed topology for one phase A of a transformerless multilevel converter in accordance with an exemplary embodiment of the present invention. FIG. 2 illustrates an alternative topology with respect to FIG. 1, wherein the same reference signs of FIG. 1 are used to label same elements in FIG. 2. It should be noted that, for the sake of simplicity, the herein further described embodiments are described with reference to the exemplary embodiment of FIG. 1. One of ordinary skill in the art will appreciate that the embodiments of FIGS. 1 and 2 may be easily substituted with one another, and that herein further described embodiments which are now described with reference to FIG. 1 do also apply to the embodiment of FIG. 2. The embodiments of FIGS. 1 and 2 are similar, but the arrangement of DC link capacitors C1, C3 in connection with the two HB configurations 42, 44 is different.

Throughout FIG. 1, QxN, QxCN indicate that the respective switching device is switched in a complementary way with respect to Qx, QxC. For example, switching device Q1N is switched in a complementary way with respect to Q1, etc. This means that Qx–QxN and QxC–QxCN can be considered complementary switching pairs, wherein when one of the switching devices, for example Q1, is switched on, the complementary switching device Q1N is switched off.

Each switching device Q1, Q1N, Q2, Q2N, Q3, Q3N, Q3C, Q3CN, Q4, Q4N, Q5, Q5N of single phase configuration 10 is responsive to control signals S1, S1N, S2, S2N, S3, S3N, S4, S4N from a controller, in particular from a PWM controller. According to an embodiment, four pairs of switching signals S1/S1N, S2/S2N, S3/S3N, S4/S4N are used to drive all the switching devices Q1, Q1N, Q2, Q2N, Q3, Q3N, Q3C, Q3CN, Q4, Q4N, Q5, Q5N. The control signals Sx/SxN are complementary signals, which means that for example when S1 is on (1), S1N is off (0).

FIG. 1 in connection with Table I, provided below, illustrate how the control signals S1/S1N, S2/S2N, S3/S3N, S4/S4N are assigned to the switching devices Q1, Q1N, Q2, Q2N, Q3, Q3N, Q3C, Q3CN, Q4, Q4N, Q5, Q5N with respect to one phase:

TABLE I

PWM signal assignment

| Signal | Switching Device |
|---|---|
| S1 | Q1, Q5 |
| S1N | Q1N, Q5N |
| S2 | Q2 |
| S2N | Q2N |
| S3 | Q3, Q3C |
| S3N | Q3N, Q3CN |
| S4 | Q4 |
| S4N | Q4N |

The four switching signals S1, S2, S3, S4 and their respective complementary switching signals S1N, S2N, S3N, S4N may be obtained from any PWM modulator using a phase-shifted PWM carrier method or a phase disposition PWM method, or other suitable PWM methods.

The phase-shifted PWM (PSPWM) carrier method is a method used for many multilevel applications such as for example cascaded H-bridge topology. Using the PSPWM carrier method, a sinusoidal waveform which is a reference for a particular phase, is compared against for example a substantially triangular carrier in order to obtain switching instances for a particular switching device, for example switching signal S2 for switching device Q2. Other carriers may be used, such as for example trapezoidal carriers. A simple logic inverter can then provide the signal for S2N. A separate carrier is used for each of the other signals S1, S3, S4, the carriers being substantially triangular carriers. A phase shift $T_{shift}$ between the carriers of one phase is given by formula (1), where $T_s$ is the switching frequency used for all switching devices:

$$T_{shift} = \frac{T_S}{4}. \tag{1}$$

Figure 3:
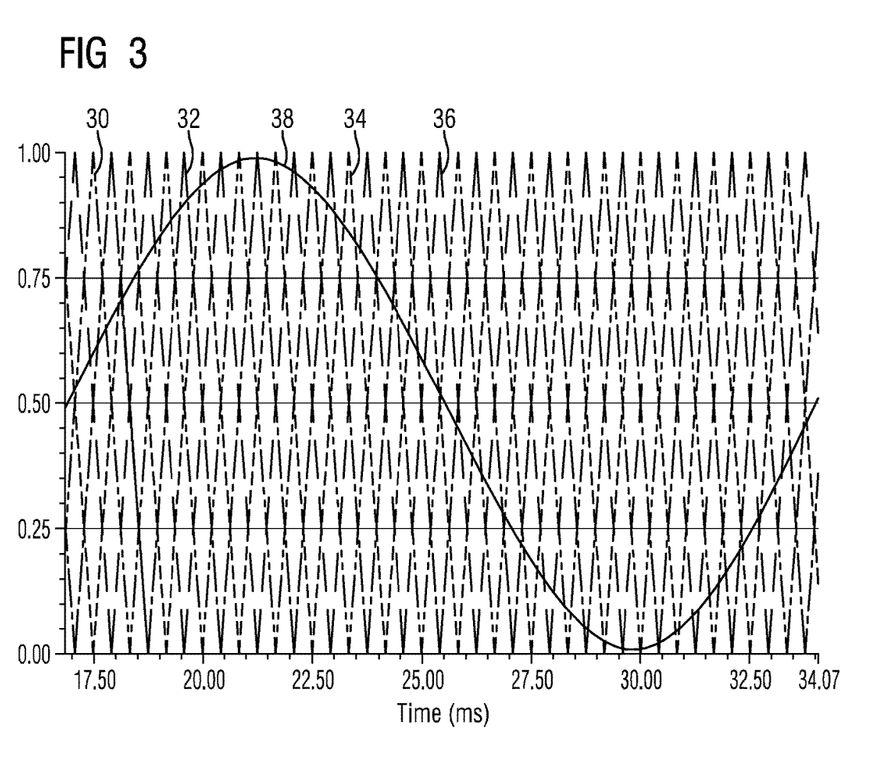
FIG. 3 illustrates a graphical representation of a carrier arrangement comprising different carriers with respect to a reference signal waveform for one phase of a transformerless multilevel converter in accordance with an exemplary embodiment of the present invention.

FIG. 3 illustrates a graphical representation of a carrier arrangement comprising different carriers with respect to a reference signal waveform for one phase of a transformerless multilevel converter in accordance with an exemplary embodiment of the present invention. FIG. 3 shows a typical carrier arrangement according to the principle described above, comprising four different carriers 30, 32, 34, 36 for the four different control signals S1, S2, S3, S4, the carriers comprising triangular waveforms, with respect to reference signal waveform 38 comprising a sinusoidal waveform.

Although the PSPWM carrier method is one of the most widely used principles for generating commands for switching devices, other PWM methods can be used. For example, an optimized PWM method is described in U.S. Pat. No. 9,184,673 to Mihalache ("PULSE WIDTH MODULATION CONTROL FOR A MULTILEVEL CONVERTER"), the content of which is incorporated by reference herein. It should be noted that, for the sake of simplicity, the herein provided embodiments are described with respect to the PSPWM carried method for providing the control commands to the switching devices.

Table II, provided below, shows possible voltage levels for the exemplary topology illustrated in FIG. 1, wherein the phase voltage potential A is measured with respect to the negative input terminal N. In Table II, signal Sx is on (1) when the respective switching device(s) Qx driven by the signal Sx is on. Signal Sx is off (0) when the switching device(s) Qx driven by the signal Sx is off.

Phase voltage $V_{AN}$ can be provided as a function of switching commands, i.e., switching control signals, and the DC-link voltage Vdc as provided in formula (2):

$$V_{AN} = (S_1 + S_2 + S_3 + S_4) \cdot V \tag{2}.$$

TABLE II

Output Phase Voltage $V_{AN}$ with respect to FIG. 1:

| S1 | S2 | S3 | S4 | $V_{AN}$ |
|---|---|---|---|---|
| 0 | 0 | 0 | 0 | 0 |
| 0 | 0 | 0 | 1 | V |
| 0 | 0 | 1 | 0 | V |
| 0 | 0 | 1 | 1 | 2 V |
| 0 | 1 | 0 | 0 | V |
| 0 | 1 | 0 | 1 | 2 V |
| 0 | 1 | 1 | 0 | 2 V |
| 0 | 1 | 1 | 1 | 3 V |
| 1 | 0 | 0 | 0 | V |
| 1 | 0 | 0 | 1 | 2 V |
| 1 | 0 | 1 | 0 | 2 V |
| 1 | 0 | 1 | 1 | 3 V |
| 1 | 1 | 0 | 0 | 2 V |
| 1 | 1 | 0 | 1 | 3 V |
| 1 | 1 | 1 | 0 | 3 V |
| 1 | 1 | 1 | 1 | 4 V |

Instantaneous currents $I_{C1}, I_{C3}, I_{C4}, I_{C5}$ through capacitors C1, C3, C4 and C5 can be expressed as provided in formulas (3)-(6), respectively:

$$I_{C1} = \tfrac{3}{4} \cdot I_1 + \tfrac{1}{4} \cdot I_2 = (\tfrac{3}{4} \cdot S_2 \cdot (1-S_1) + \tfrac{1}{4} \cdot S_1 \cdot (1-S_2)) \cdot I_{out} \tag{3};$$

$$I_{C3} = -\tfrac{1}{4} \cdot I_1 - \tfrac{3}{4} \cdot I_2 = -(\tfrac{1}{4} \cdot S_2 \cdot (1-S_1) + \tfrac{3}{4} \cdot S_1 \cdot (1-S_2)) \cdot I_{out} \tag{4};$$

$$I_{C4} = (S_2 - S_3 \cdot S_4) \cdot I_{out} \tag{5};$$

$$I_{C5} = ((1-S_3) \cdot (1-S_4) - (1-S_2)) \cdot I_{out} \tag{6}.$$

In order to keep voltages of capacitors C1, C3, C4, C5 at desired values, average currents of C1, C3, C4, C5 should be equal to zero. Even though there are three capacitors C1, C2, C3 on the DC link 14, with inner capacitor C2 twice the voltage of outer capacitors C1 and C3, as long as outer capacitors C1 and C3 can be maintained at their correct voltage value of one-fourth of the DC link voltage Vdc, the voltage of inner capacitor C2 will also have a correct level.

Relationships expressed by formulas (3) to (6) may be further simplified as a function of instantaneous value of the modulating reference signal waveform 38 (see FIG. 3). Assuming a phase reference voltage is given as in formula (7), capacitor currents $I_{C1}, I_{C3}, I_{C4}, I_{C5}$ through capacitors C1, C3, C4, C5 may be written as shown in Table III, provided below, as a function of the phase current $I_{OUT}$ and duty cycles $d_1, d_2, d_3, d_4$ of each switching signal S1, S2, S3 and S4, respectively:

$$\text{ref} = m \cdot \sin(\omega \cdot t) \tag{7}$$

It can be shown that in steady-state and ideal conditions, relationship as illustrated in formula (8) is true, which means that average currents through capacitors C1, C3, C4 and C5 are zero over an output fundamental frequency. This also means that the capacitors C1, C3, C4, C5 are able to maintain their voltages at a desired, initial level:

$$\int_0^{2\pi} I_{C_1} = \int_0^{2\pi} I_{C_3} = \int_0^{2\pi} I_{C_4} = \int_0^{2\pi} I_{C_5} = 0 \quad (8)$$

TABLE III

Average capacitor currents $I_{C1}$, $I_{C3}$, $I_{C4}$, $I_{C5}$ as a function of current and duty cycles $d_1$, $d_2$, $d_3$, $d_4$ (per one switching cycle):

|  | $-1 \leq \text{ref} \leq -\frac{1}{2}$ (m > 0.5) | $-\frac{1}{2} \leq \text{ref} \leq \frac{1}{2}$ (m < 0.5) | $\frac{1}{2} \leq \text{ref} \leq 1$ (m > 0.5) |
|---|---|---|---|
| $I_{C1}$ | $I_{out} \cdot \left(\frac{3}{4} \cdot d_2 + \frac{1}{4} \cdot d_1\right)$ | $I_{out} \cdot \frac{1}{4}$ | $I_{out} \cdot \left(1 - \frac{3}{4} \cdot d_1 - \frac{1}{4} \cdot d_2\right)$ |
| $I_{C3}$ | $-I_{out} \cdot \left(\frac{3}{4} \cdot d_1 + \frac{1}{4} \cdot d_2\right)$ | $I_{out} \cdot \frac{1}{4}$ | $-I_{out} \cdot \left(1 - \frac{3}{4} \cdot d_2 - \frac{1}{4} \cdot d_1\right)$ |
| $I_{C4}$ | $I_{out} \cdot d_2$ | $I_{out} \cdot (d_2 - d_3 \cdot d_4)$ | $I_{out} \cdot (1 + d_2 - d_3 - d_4)$ |
| $I_{C5}$ | $I_{out} \cdot (d_2 - d_3 - d_4)$ | $I_{out} \cdot (d_2 - d_3 - d_4 + d_3 \cdot d_4)$ | $I_{out} \cdot (d_2 - 1)$ |

However, there can be several non-ideal conditions such as finite device switching times, device voltage drop, duty cycle mismatches between the switching devices, dynamic steps, etc. All these conditions can affect the voltages across the capacitors C1, C3, C4, C5. If not mitigated, one or more of the capacitors C1, C3, C4, C5 may drift either higher or lower with respect to their voltages from the initial condition.

To counterbalance any effects of non-ideal conditions, the four duty cycles $d_1$, $d_2$ $d_3$ and $d_4$ can be slightly altered in order to influence each capacitor current $I_{C1}$, $I_{C3}$, $I_{C4}$, $I_{C5}$ as it can be seen for example in Table III. Based on phase current polarity and instantaneous location of the modulating waveform, the current $I_{C1}$, $I_{C3}$, $I_{C4}$, $I_{C5}$ through a specific capacitor C1, C3, C4, C5 can be modified to accelerate or decelerate charge/discharge of the specific capacitor C1, C3, C4, C5 without affecting the output voltage of the specific capacitor as long as duty cycle modifications follow formula (9), which is a condition sufficient in accordance with formula (2):

$$\Delta d_1 + \Delta d_2 + \Delta d_3 + \Delta d_4 = 0 \quad (9).$$

Figure 4:
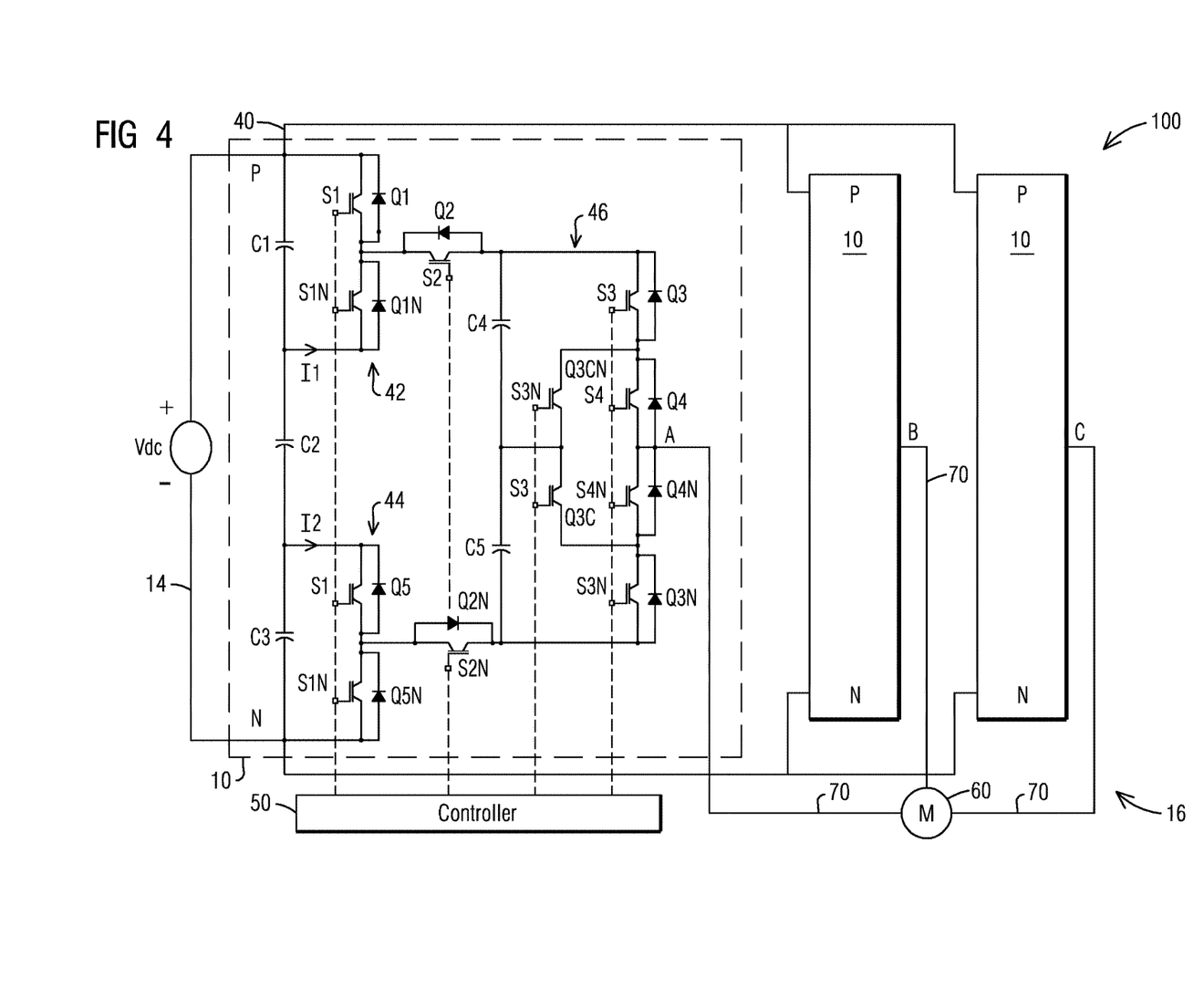
FIG. 4 illustrates a schematic of an embodiment of a system comprising a transformerless multilevel converter, in particular a three-phase motor drive voltage inverter, in accordance with an exemplary embodiment of the present invention.

FIG. 4 illustrates a schematic of an embodiment of a system comprising a transformerless multilevel converter, in particular a three-phase motor drive voltage inverter, in accordance with an exemplary embodiment of the present invention.

FIG. 4 shows a system 100 comprising a three-phase motor drive voltage inverter 40 comprising three phases A, B, C. Each phase comprises a single phase configuration 10, herein also referred to as single phase module 10, connected to the DC link 14, wherein for each phase A, B, C a single phase module 10 comprises a topology as described in FIG. 1. Alternatively, the inverter 40 can comprise for one or more phase(s) A, B, C single phase module(s) 10 with a topology as described in FIG. 2. As can be seen in FIG. 4, the complete circuitry is only illustrated for phase A, and topologies for phases B and C are only illustrated schematically.

As described before, for each phase A, B, C of the exemplary inverter 40, the proposed topology comprises first and second half-bridge (HB) modules 42, 44 separated by a DC link capacitor C2, a neutral point clamped (NPC) module 46 and two individual switching devices Q2, Q2N. Individual switching device Q2 is operably connected to the first HB module 42 and the NPC module 46, and the second individual switch Q2N is operably connected to the second HB module 44 and the NPC module 46.

According to the described embodiment, the proposed topology comprises a total of 12 switching devices per phase A, B, C. DC link 14 provides voltage Vdc to the single phase modules 10. DC link 14 is common to all phases A, B, C, which also means that capacitors C1, C2, C3 coupled to DC link 14 are common to all phases A, B, C. Thus, only eight capacitors (common DC link capacitors C1, C3, and capacitors C4, C5 of each single phase module 10) may need to be balanced for a three-phase inverter 40.

The inverter 40 can be operably coupled to a controller 50, in particular pulse width modulation (PWM) controller, and a motor 60, which is in particular an AC motor. The inverter 40 can be used for a medium voltage drive, for example a 4160V medium voltage drive. The transformerless multilevel converter 40 comprises a power output assembly 16 and produces a three-phase AC power supply as output via phase output lines 70. The AC output via lines 70 may be connected to a load, which in this example comprises the motor 60. The motor 60 may be operated by controlling the frequency and/or amplitude of the output voltage produced by the multilevel inverter 40.

The motor 60 may comprise any AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one AC motor 60 may be connected. Other loads may be used instead of or in addition to the motor 60. The AC motor 60 responds to the voltage applied by the multilevel converter on the three phases A, B, C, for example, to increase, decrease or maintain a speed or position.

The controller 50 may comprise, for example, a processor with a memory, which is capable of storing and executing specific instructions to implement the illustrated PWM control. The controller 50 may be realised, for example and without limitation, by a microcontroller with internal or external memory, or by a fixed-point or floating-point digital signal processor (DSP), or by a programmable logic device (PLD), or any combination of the above mentioned.

Figure 5:
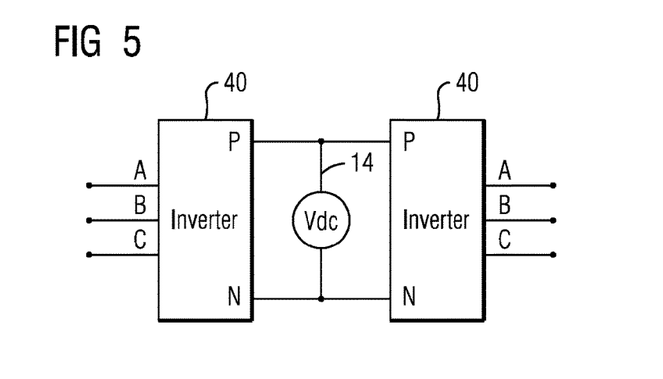
FIG. 5 illustrates a schematic of an embodiment of a back-to-back arrangement comprising three-phase motor drive voltage inverters as illustrated in FIG. 4 in accordance with an exemplary embodiment of the present invention.

FIG. 5 illustrates a schematic of an embodiment of a back-to-back arrangement comprising three-phase motor drive voltage inverters 40 as illustrated for example in FIG. 4 in accordance with an exemplary embodiment of the present invention.

As described before, input voltage of the DC link 14 can be provided for example by a standard transformer/diode rectifier. Alternatively, as illustrated in FIG. 5, a back-to-back inverter arrangement can be used for a typical transformerless motor drive topology. The arrangement of FIG. 5 comprises two inverters 40 as described in FIG. 4, wherein DC link 14 comprising voltage Vdc with input terminals P and N feeds both inverters 40 so that each inverter 40 comprises an input or output in form of three-phase AC power with three phases A, B, C.

Figure 6:
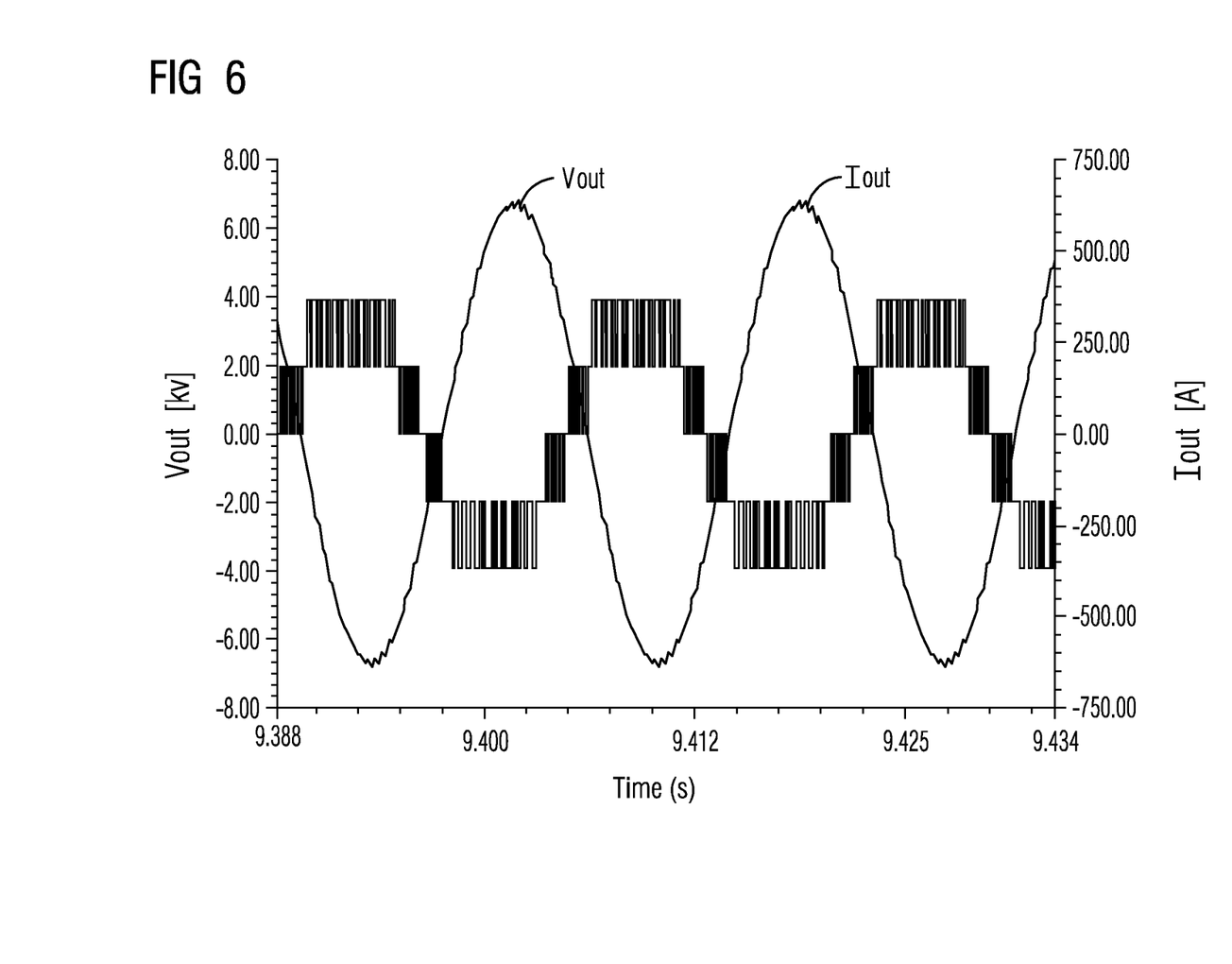
FIG. 6 illustrates graphical representations of a simulated output voltage and current waveforms obtained with PSPWM in a transformerless multilevel converter for one phase, in accordance with an exemplary embodiment of the present invention.

FIG. 6 illustrate graphical representations of simulated waveforms of output voltage $V_{OUT}$ and output current $I_{OUT}$ obtained with PSPWM in a transformerless multilevel converter 40 for one phase A, B or C, respectively, in accordance with an exemplary embodiment of the present invention. Simulation parameters are presented in Table IV below.

TABLE IV

Simulation Parameters:

| Parameter | Value |
| --- | --- |
| C1, C3, C4, C5 | Each 10,000 µF |
| C2 | 5,000 µF |
| Switching Frequency | 600 Hz |
| DC-link voltage | 1,950*4 = 7,800 V |
| Rload | 5.41 ohms |
| Lload | 7.6 mH |

Figure 7:
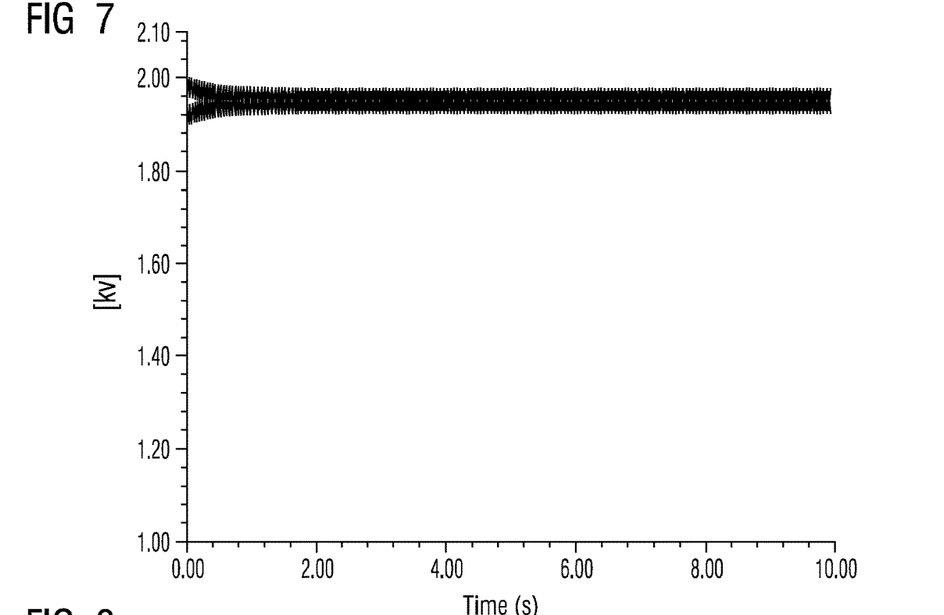
FIG. 7 and FIG. 8 illustrate graphical representations of simulated voltages of capacitors coupled to a DC link, obtained with PSPWM in a transformerless multilevel converter for one phase, in accordance with an exemplary embodiment of the present invention.
Figure 8:
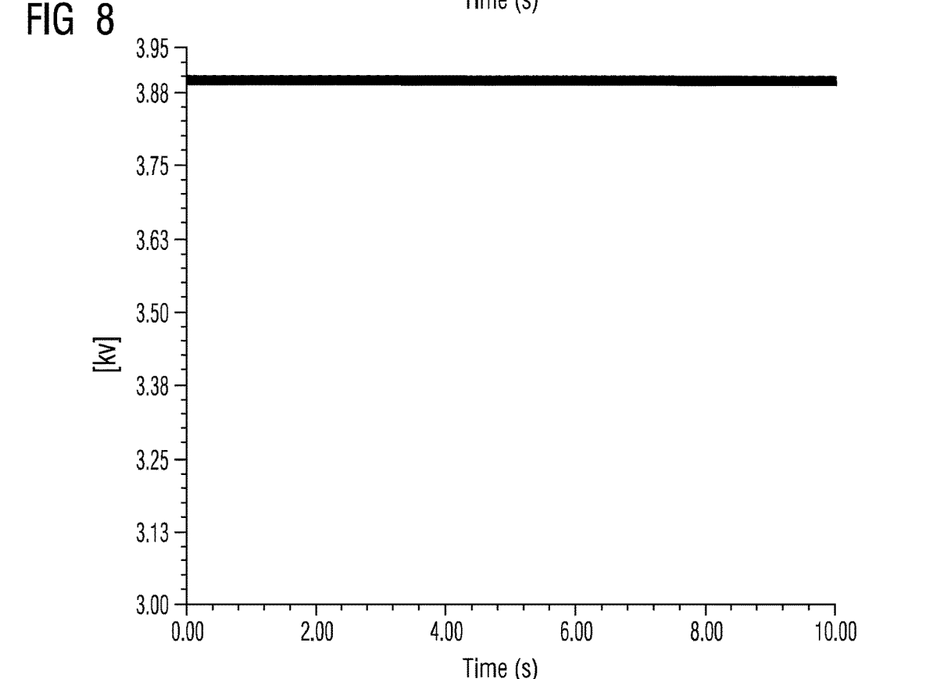

FIG. 7 and FIG. 8 illustrate graphical representations of simulated voltages of DC link capacitors C1, C2, C3, wherein FIG. 7 illustrates simulated voltages of outer DC link capacitors C1 and C3 (see for example FIG. 1), and FIG. 8 illustrates a simulated voltage of inner DC-link capacitor C2 (see for example FIG. 1), in accordance with an exemplary embodiment of the present invention. The simulated voltages are obtained while operating the multilevel inverter 40 with PSPWM and simulation parameters as shown in Table IV. As FIG. 7 shows, capacitors C1 and C3 maintain their initial average value. As a result of this, capacitor C2 also maintains the initial average value, which is half the DC link voltage Vdc, and double the voltage of capacitors C1 and C3.

Figure 9:
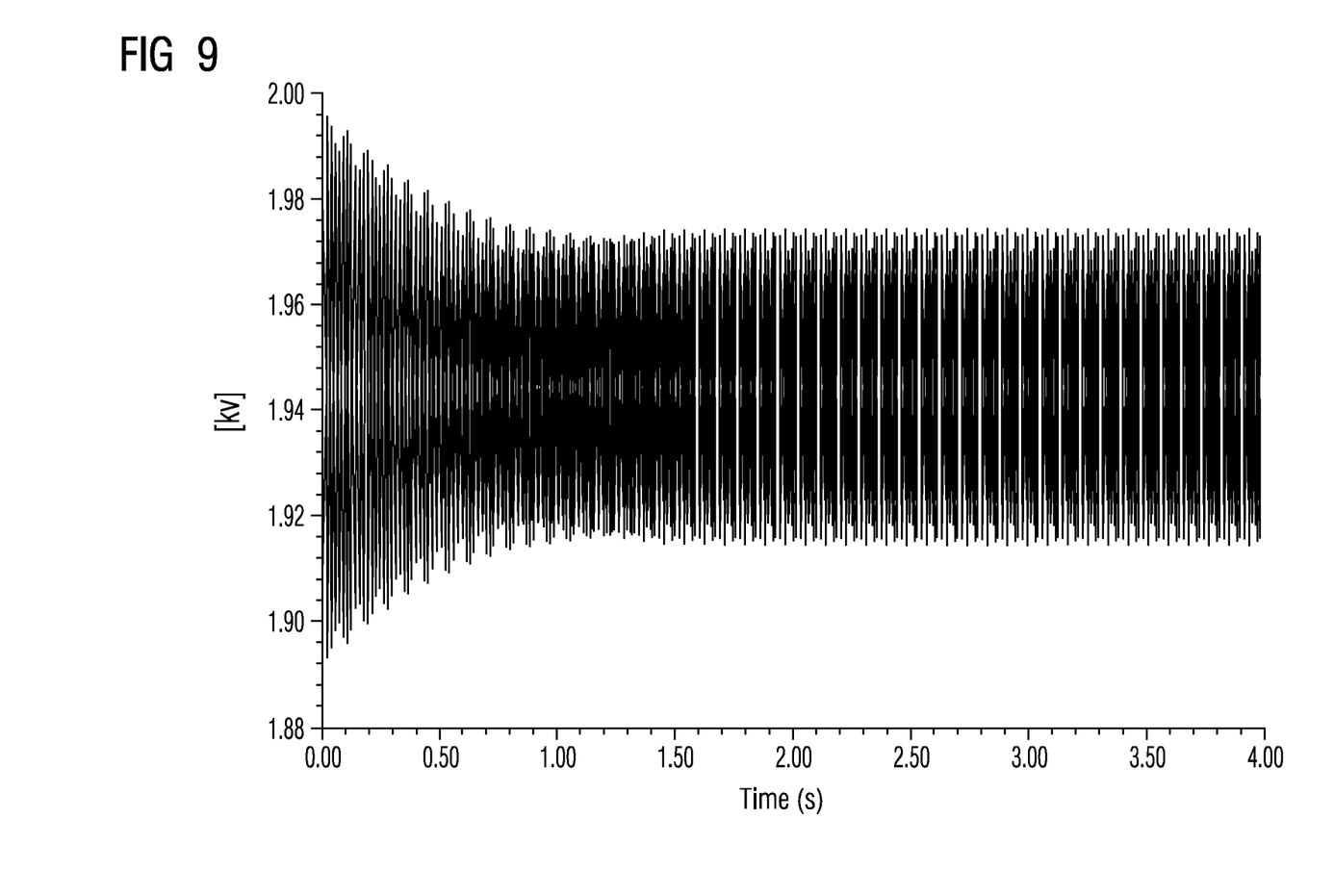
FIG. 9 illustrates a graphical representation of simulated voltages of capacitors of a NPC module, obtained with PSPWM in a transformerless multilevel converter for one phase, in accordance with an exemplary embodiment of the present invention.

FIG. 9 illustrates a graphical representation of simulated voltages of capacitors C4 and C5 of NPC module 46 (see for example FIG. 4), in accordance with an exemplary embodiment of the present invention. The simulated voltages are obtained while operating the multilevel inverter 40 with PSPWM and simulation parameters as shown in Table IV. As FIG. 9 shows, the capacitors C4 and C5 also essentially maintain their initial average value which is one fourth of the provided DC link voltage Vdc.

Figure 10:
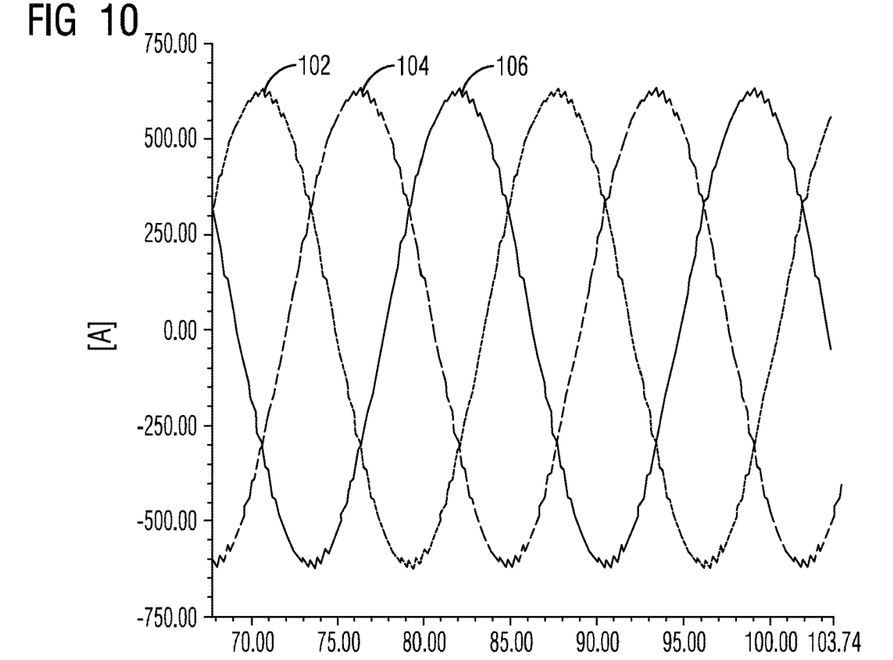
FIG. 10 and FIG. 11 illustrate graphical representations of simulated waveforms of output currents and line-line voltages, obtained with PSPWM in a transformerless multilevel converter for three phases, respectively, in accordance with an exemplary embodiment of the present invention.
Figure 11:
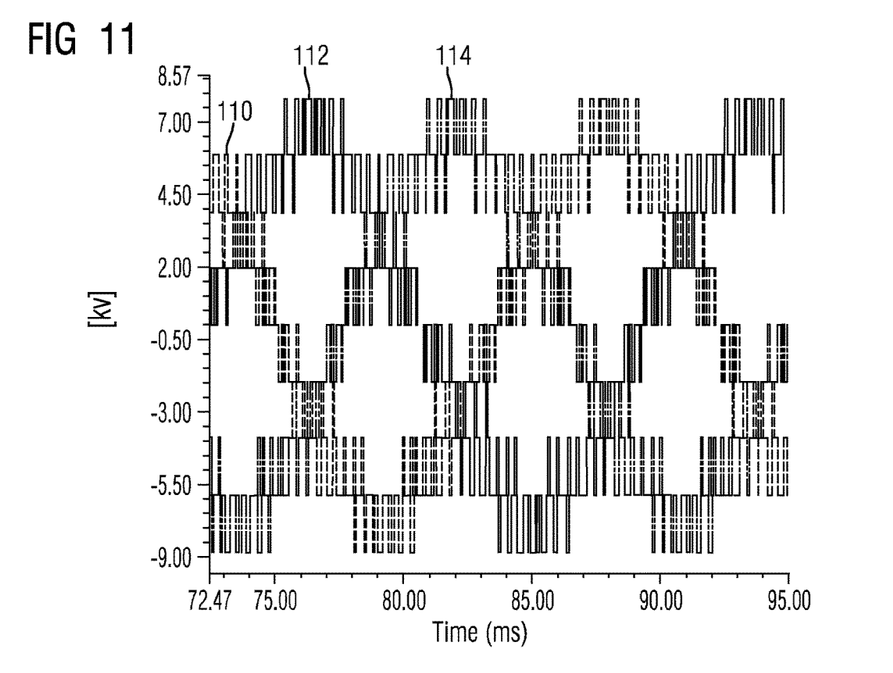

FIG. 10 and FIG. 11 illustrate graphical representations of simulated waveforms of output currents 102, 104, 106 (FIG. 10) and line-line voltages 110, 112, 114 (FIG. 11) obtained with PSPWM in a transformerless multilevel converter 40 for all three phases A, B or C, respectively, in accordance with an exemplary embodiment of the present invention. Simulation parameters are presented in Table IV.

Summarizing, according to exemplary embodiments, a transformerless multilevel converter 40 as described herein comprises the following features:

On each phase A, B and C, a proposed topology comprises two half-bridge (HB) modules 42, 44 separated by a DC link capacitor C2, also referred to as inner capacitor, one neutral point clamped (NPC) module 46 and two individual switching devices Q2, Q2N.

There are two capacitors C1 and C3 at DC link 14 and two capacitors C4 and C5 of the NPC module 46 that may need to be balanced. Each of these capacitors is rated for a quarter of a provided DC link bus voltage Vdc.

The DC link 14 is common to all phases A, B, C; thus, only eight capacitors may need to be balanced for a three-phase inverter 40.

All switching devices Q1, Q1N, Q2, Q2N, Q3, Q3N, Q3C, Q3CN, Q4, Q4N, Q5, Q5N have a voltage stress equal to a quarter of the provided DC link bus voltage Vdc.

Because there are no switching devices connected in series, the proposed inverter 40 allows simpler gate drive control and leads to a more reliable product.

Either phase-shifted pulse width modulation (PSPWM) or phase-disposition PWM (PDPWM) control can be used. In both cases, an effective output switching frequency is four times a switching frequency of an individual switching device. All switching devices Q1, Q1N, Q2, Q2N, Q3, Q3N, Q3C, Q3CN, Q4, Q4N, Q5, Q5N are switched at a same frequency.

The proposed exemplary inverter 40 can be used in a transformerless application (back-to-back transformerless-type topology, see for example FIG. 5). But the inverter 40 may also be used with a front-end transformer in case of an input-output voltage mismatch. In this case, a much simpler transformer may be used.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A multilevel converter comprising:
a plurality of single phase configurations, a single phase configuration comprising:
a first half-bridge (HB) module and a second half-bridge (HB) module separated by a first capacitor coupled to a DC link providing voltage to the single phase configuration,
a neutral point clamped (NPC) module, the NPC module being clamped to the first HB module and the second HB module,
a first individual switching device and a second individual switching device, the first individual switching device operably connected to the first HB module and the NPC module, and the second individual switching device operably connected to the second HB module and the NPC module; and
a power output assembly comprising three phases (A, B, C) and providing three-phase alternating (AC) power, wherein the single phase configuration supplies power to one of the three phases (A, B, C) of the power output assembly.

2. The multilevel converter of claim 1, wherein the first HB module comprises a first plurality of switching devices and a second capacitor rated for one fourth of a voltage provided by the DC link.

3. The multilevel converter of claim 1, wherein the second HB module comprises a second plurality of switching devices and a third capacitor rated for one fourth of a voltage provided by the DC link.

4. The multilevel converter of claim 1, wherein the NPC module comprises a third plurality of switching devices and fourth and fifth capacitors, each of the fourth and fifth capacitors rated for one fourth of a voltage provided by the DC link.

5. The multilevel converter of claim 1, wherein the first capacitor is rated for one half of a voltage provided by the DC link.

6. The multilevel converter of claim 1, wherein a controller is operably coupled to each of the individual switching devices and the switching devices of the first, second and third pluralities of switching devices for controlling switching events of the switching devices by pulse width modulation, wherein the switching devices are switched at a same switching frequency.

7. The multilevel converter of claim 1, comprising a single phase configuration for each phase, wherein the DC link and the first, second, and third capacitors are common to all single phase configurations.

8. A method for controlling a multilevel converter comprising:
provide single phase configurations including a plurality of switching devices; and
switching the plurality of switching devices using pulse width modulation (PWM),
wherein the plurality of switching devices are switched at a same switching frequency,
wherein a plurality of pairs of complementary PWM control signals are used to switch the plurality of switching devices, and further comprising
obtaining the complementary PWM control signals by a phase shifted PWM (PSPWM) carrier method or a phase disposition PWM method,
wherein separate carriers are used for each pair of the plurality of pairs of complementary PWM control signals of a single phase configuration (10), a phase shift $T_{shift}$ between the separate carriers corresponding to $$T_{shift} = \frac{T_S}{4},$$

where $T_s$ is a switching frequency.

9. The method for controlling a multilevel converter of claim 8, wherein each pair of the plurality of pairs of complementary PWM control signals comprises complementary first and second control signals, wherein, when the first signal is on (1), the second signal is off (0).

10. The method for controlling the multilevel converter of claim 8, wherein the complementary PWM control signals are obtained by the PSPWM carrier method based upon a plurality of carrier signals comprising a waveform having a substantially triangular shape compared to a reference signal comprising a waveform having a substantially sinusoidal shape.

11. The method for controlling a multilevel converter of claim 8, wherein a single phase configuration comprises:
a first half-bridge (HB) module and a second half-bridge (HB) module separated by a first capacitor coupled to a DC link providing voltage to the single phase configuration; and
a neutral point clamped (NPC) module, the NPC module being clamped to the first HB module and the second HB module,
wherein the first HB module comprises a second capacitor rated for one fourth of a voltage provided by the DC link, and the second HB module comprises a third capacitor rated for one fourth of a voltage provided by the DC link, and
wherein the NPC module comprises fourth and fifth capacitors, each of the fourth and fifth capacitors rated for one fourth of a voltage provided by the DC link.

12. The method for controlling a multilevel converter of claim 11, further comprising:
altering duty cycles ($d_1$, $d_2$ $d_3$, $d_4$) for controlling the plurality of switching devices in order to influence currents of capacitors, wherein duty cycle modifications correspond to $\Delta d_1 + \Delta d_2 + \Delta d_3 + \Delta d_4 = 0$.

13. The method for controlling a multilevel converter of claim 11, comprising a single phase configuration for each phase, wherein the DC link and the first, second, and third capacitors are common to all single phase configurations.

14. An electric drive system comprising:
a power source assembly comprising a direct current (DC) link;
a multilevel converter coupled to the DC link for producing a multi-phase power, the converter comprising single phase configurations, wherein the DC link provides voltage to the single phase configurations, a single phase configuration comprising:
a first half-bridge (HB) module and a second half-bridge (HB) module separated by a first capacitor coupled to the DC-link,
a neutral point clamped (NPC) module, the NPC module being clamped to the first HB module and the second HB module,
a first individual switching device and a second individual switching device, the first individual switching device operably connected to the first HB module and the NPC module, and the second individual switching device operably connected to the second HB module and the NPC module; and
a power output assembly comprising three phases and providing three-phase alternating (AC) power, wherein the single phase configuration supplies power to one of the three phases of the power output assembly.

15. The electric drive system of claim 14, further comprising:
a load, the load comprising an electric machine and being connected to the power output assembly.

16. The electric drive system of claim 15, wherein the electric machine comprises a medium-voltage AC motor operating in a range of 4.16 kV to 13.8 kV.

17. The electric drive system of claim 14, wherein the first HB module comprises a first plurality of switching devices, the second HB module comprises a second plurality of switching devices, and the NPC module comprises a third plurality of switching devices.

18. The electric drive system of claim 17, further comprising a pulse width (PWM) modulation controller operably coupled to each of the individual switching devices and the switching devices of first and second HB modules and the NPC module for controlling switching events of the switching devices by pulse width modulation, wherein the switching devices are switched at a same switching frequency.

* * * * *